(12) United States Patent
Choi et al.

(10) Patent No.: US 11,816,804 B2
(45) Date of Patent: Nov. 14, 2023

(54) METHOD AND SYSTEM OF RECOMMENDING ACCOMMODATION FOR TOURISTS USING MULTI-CRITERIA DECISION MAKING AND AUGMENTED REALITY

(71) Applicant: INDUSTRY ACADEMY COOPERATION FOUNDATION OF SEJONG UNIVERSITY, Seoul (KR)

(72) Inventors: Soo Mi Choi, Seoul (KR); Abolghasem Sadeghi-Niaraki, Seoul (KR); Somaiieh Rokhsaritalemi, Seoul (KR)

(73) Assignee: INDUSTRY ACADEMY COOPERATION FOUNDATION OF SEJONG, Seoul (KR)

( * ) Notice: Subject to any disclaimer, the term of this patent is extended or adjusted under 35 U.S.C. 154(b) by 0 days.

(21) Appl. No.: 17/560,064

(22) Filed: Dec. 22, 2021

(65) Prior Publication Data
US 2023/0169735 A1 Jun. 1, 2023

(30) Foreign Application Priority Data
Dec. 1, 2021 (KR) .................... 10-2021-0169659

(51) Int. Cl.
*G06T 19/00* (2011.01)
*G10L 15/08* (2006.01)
*G06V 10/764* (2022.01)

(52) U.S. Cl.
CPC .......... *G06T 19/006* (2013.01); *G06T 19/003* (2013.01); *G06V 10/765* (2022.01); *G10L 15/083* (2013.01)

(58) Field of Classification Search
CPC ...... G06T 19/006; G06Q 50/12; G06Q 50/10; G06Q 50/14
See application file for complete search history.

(56) References Cited

U.S. PATENT DOCUMENTS

| | | | |
|---|---|---|---|
| 10,453,226 B1 * | 10/2019 | Burrows | G01C 21/367 |
| 2014/0114705 A1 * | 4/2014 | Bashvitz | G06Q 10/1093 705/5 |
| 2017/0132226 A1 * | 5/2017 | Kalis | H04L 51/52 |
| 2018/0308187 A1 * | 10/2018 | Rotem | G06F 3/0482 |
| 2019/0164211 A1 * | 5/2019 | Andrew | G06N 20/00 |

(Continued)

FOREIGN PATENT DOCUMENTS

| | | | | |
|---|---|---|---|---|
| CN | 107852571 A | * | 3/2018 | A63F 13/30 |
| CN | 109962939 A | * | 7/2019 | G06F 17/30241 |

(Continued)

*Primary Examiner* — Chante E Harrison

(57) ABSTRACT

Disclosed are a method and a system of recommending an accommodation for tourists using multi-criteria decision making (MCDM) and augmented reality. A method of recommending an accommodation for tourists using multi-criteria decision making and augmented reality, which is performed by a server device includes: selecting a recommendation target accommodation based on a current location of a user; selecting a plurality of recommended accommodations by MCDM based on user information including pre-registered preference information among the recommendation target accommodations; and providing an augmented reality interface displaying information on a recommended accommodation to a user terminal.

6 Claims, 3 Drawing Sheets

(56) References Cited

U.S. PATENT DOCUMENTS

| | | | |
|---|---|---|---|
| 2020/0117687 A1* | 4/2020 | Parulski | G06Q 50/14 |
| 2021/0034682 A1* | 2/2021 | Manggala | G06Q 30/0641 |
| 2022/0019627 A1* | 1/2022 | Baron | G06F 16/951 |
| 2022/0207575 A1* | 6/2022 | Wilson | G06Q 20/203 |

FOREIGN PATENT DOCUMENTS

| | | | | |
|---|---|---|---|---|
| CN | 112818259 A | * | 5/2021 | |
| JP | 2010508592 A | * | 3/2010 | |
| KR | 10-2141851 B1 | | 4/2020 | |
| KR | 20210042286 A | * | 4/2021 | |
| WO | WO-2018176053 A1 | * | 9/2018 | G06F 17/30979 |

\* cited by examiner

FIG. 5

| INTERNAL PLACE | SEARCH TIME | VOICE RECOGNITION CONTENTS |
|---|---|---|
| LIVING ROOM | 7 SECONDS | THE LIVING ROOM IS NEAT. |
| TOILET | 3 SECONDS | ... |
| ROOM | 4 SECONDS | THE ROOM IS A LITTLE SMALL. |
| KITCHEN | 11 SECONDS | THERE ARE MANY KITCHEN TOOLS AND I CAN DO THE COOKING. |

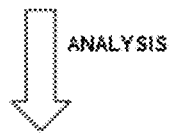

ANALYSIS

INTERNAL PREFERRED PLACE : KITCHEN

FIG. 6

| USER LOCATION | JUNGMUN, SEOGUIPO, JEJU |
|---|---|
| PERSONAL INFORMATION | MALE, FORTIES |
| PREFERENCE INFORMATION | MEDIUM PRICE, RESORT, LATEST TYPE ... |
| INTERNAL PREFERRED PLACE | KITCHEN |

METHOD AND SYSTEM OF RECOMMENDING ACCOMMODATION FOR TOURISTS USING MULTI-CRITERIA DECISION MAKING AND AUGMENTED REALITY

CROSS-REFERENCE TO RELATED APPLICATION

This application claims under 35 U.S.C. § 119(a) priority to and the benefit of Korean Patent Application No. 10-2021-0169659 filed on Dec. 1, 2021, the entire contents of which are incorporated herein by reference.

BACKGROUND

(a) Technical Field

The present disclosure relates to recommending accommodation for tourists, and more particularly, to a method and a system of recommending an accommodation for tourists using multi-criteria decision making and augmented reality.

(b) Background Art

As a demand for traveling from all over the world is increasing, the public interest of the tourism industry is increasing. Further, a tourism industry promotes economic growth through foreign capital and appropriate development requires the use of new ideas, and smart tourism is one of the ideas. A result of the smart tourism is a design of an intelligent system that increases automation of a tourism service.

A most important result of the smart tourism is a design of an intelligent decision system which enables the automation of the tourism service. Such a system provides various alternatives to tourists. One of the largest proportions in the tourism is to recommend an accommodation such as a hotel, a resort, etc., suitable for user's tendency. In related art, as such a system is just a recommendation which depends on reviews of other tourists, a person customized recommendation service such as a tourism purpose, a tendency, etc., of a tourist is required. Moreover, it is necessary to increase satisfaction of the tourist by providing a high-accuracy tourism recommendation service using artificial intelligence of which technologies has been rapidly grown in recent years.

SUMMARY OF THE DISCLOSURE

Accordingly, the present disclosure is contrived to solve the problem, and it is an object to provide a method and a system of recommending an accommodation for tourists using multi-criteria decision making (MCDM) and augmented reality, which recommend an accommodation suitable for tendency, preference, etc., of a tourist, and provide information on the recommended accommodation with the augmented reality.

In addition, it is another object of the present disclosure to provide a method and a system of recommending an accommodation for tourists using multi-criteria decision making (MCDM) and augmented reality, which determine a preferred place of a user for an inside of an accommodation provided with the augmented reality in real time and provide a customized recommendation service.

Other objects of the present disclosure will be clearer through preferred embodiments to be described below.

According to one aspect of the present disclosure, a method of recommending an accommodation for tourists using multi-criteria decision making and augmented reality, which is performed by a server device, including: selecting recommendation target accommodations based on a current location of a user; selecting a plurality of recommended accommodations by MCDM based on user information including pre-registered preference information among the recommendation target accommodations; and providing an augmented reality interface displaying information on the recommended accommodation to a user terminal and a recording medium having a program for executing the method recorded therein are provided.

Here, the method may further include: providing image information for each internal place of the recommended accommodation by the augmented reality interface and recognizing an internal preferred place based on usage information of the user terminal; and determining a ranking for each recommended accommodation based on the internal preferred place and guiding the ranking by using the augmented reality interface.

Further, the internal preferred place is recognized by using a search time for each place inside the accommodation which the user verifies by using the augmented reality interface.

Further, the internal preferred place is identified by further using information by user voice recognition in each internal place.

Further, when internal images for recommended accommodations are provided, the internal preferred place is processed as a start location.

According to another aspect of the present disclosure, provided is a system of recommending an accommodation for tourists using multi-criteria decision making and augmented reality, including: a storage unit storing information on a tourist accommodation including a location and an indoor image; an accommodation recommendation unit selecting a recommendation target accommodation based on a current location of a user by referring to the storage unit, and selecting a plurality of recommended accommodations by multi-criteria decision making based on user information including pre-registered preference information among the recommendation target accommodations; and an augmented reality unit providing an augmented reality interface displaying information on the recommended accommodation to a user terminal.

According to the present disclosure, it is possible to provide an accommodation recommendation service optimized for tendency and preference of a tourist by recommending a user customized accommodation and providing information on the recommended accommodation with augmented reality.

Further, according to the present disclosure, it is possible to provide a real-time customized recommendation service by determining a preferred place of a user for an inside of the accommodation.

BRIEF DESCRIPTION OF THE DRAWINGS

FIG. 5 is a table illustrating usage information of an augmented reality interface for recognizing an internal preferred place of a user according to an exemplary embodiment of the present disclosure.

FIG. 6 is a table illustrating user preference information for recommending an accommodation according to an exemplary embodiment of the present disclosure.

DETAILED DESCRIPTION

Figure 1:
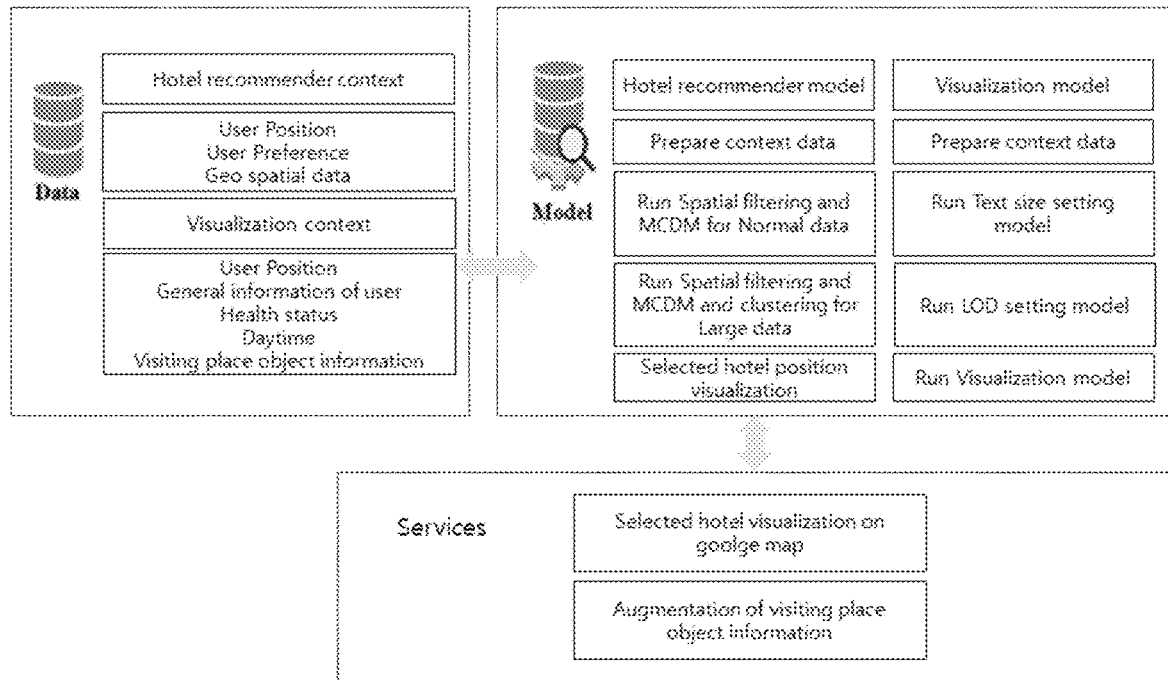
FIG. 1 is a conceptual diagram of an accommodation recommendation system according to an exemplary embodiment of the present disclosure.

The present disclosure may have various modifications and various exemplary embodiments and specific exemplary embodiments will be illustrated in the drawings and described in detail in the detailed description. However, this does not limit the present disclosure to specific exemplary embodiments, and it should be understood that the present disclosure covers all the modifications, equivalents, and replacements included within the idea and technical scope of the present disclosure.

It should be understood that, when it is described that a component is "connected to" or "accesses" another component, the component may be directly connected to or access the other component or a third component may be present therebetween. In contrast, when it is described that a component is "directly connected to" or "directly accesses" another component, it is to be understood that no element is present between the element and another element.

Terms including as first, second, and the like are used for describing various components, but the components should not be limited by the terms. The terms are used only to discriminate one element from another element. For example, terms such as a first threshold value, a second threshold value, etc., to be described later, may be pre-designated to threshold values which are substantially different or partially the same, but when expressed in the same word called a threshold value, there is a room for confusion, and as a result, for convenience of distinction, the terms such as the first, the second, etc., will be written together.

Terms used in the present specification are used only to describe specific exemplary embodiments, and are not intended to limit the present disclosure. A singular form includes a plural form unless the context clearly dictates otherwise. In the present specification, it should be understood that term "include" or "have" indicates that a feature, a number, a step, an operation, a component, a part, or the combination thereof described in the specification is present, but does not exclude a possibility of presence or addition of one or more other features, numbers, steps, operations, components, parts, or combinations thereof, in advance.

Further, the components of the embodiments described with reference to each drawing are not limited only to the corresponding exemplary embodiment, and may be implemented to be included in another embodiment within a scope in which the technical spirit of the present disclosure is maintained, and further, even though a separate description is omitted, it is natural that a plurality of exemplary embodiments may be implemented as one integrated exemplary embodiment again.

In addition, in the description with reference to the accompanying drawings, the same components are assigned the same or related reference numerals regardless of the reference numerals, and redundant descriptions thereof will be omitted. In describing the present disclosure, a detailed description of a related known technology will be omitted if it is determined that it may unnecessarily obscure the gist of the present disclosure.

Figure 2:
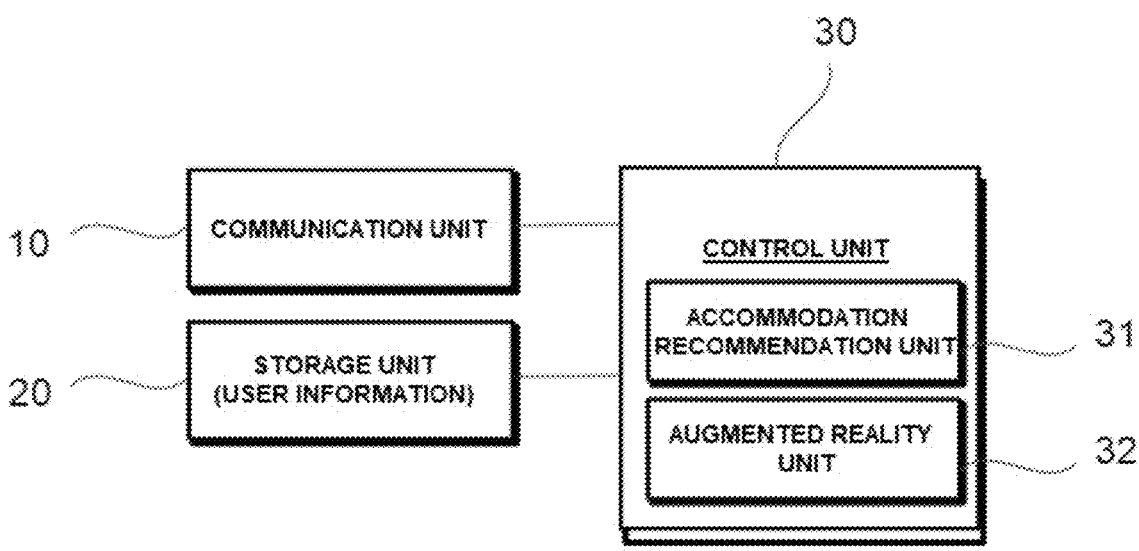
FIG. 2 is a functional block diagram schematically illustrating a configuration of a system of recommending an accommodation for tourists using multi-criteria decision making and augmented reality according to an exemplary embodiment of the present disclosure.
Figure 3:
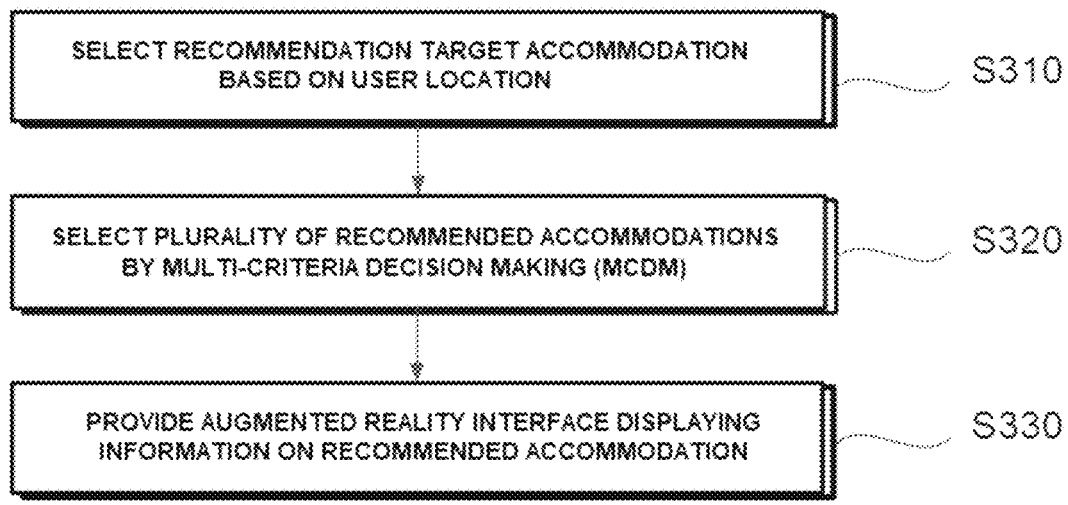
FIG. 3 is a flowchart illustrating a process of recommending an accommodation for tourists using multi-criteria decision making and augmented reality according to an exemplary embodiment of the present disclosure.

FIG. 1 is a conceptual diagram of an accommodation recommendation system according to an exemplary embodiment of the present disclosure, FIG. 2 is a functional block diagram schematically illustrating a configuration of a system of recommending an accommodation for tourists using multi-criteria decision making and augmented reality according to an exemplary embodiment of the present disclosure, and FIG. 3 is a flowchart illustrating a process of recommending an accommodation for tourists using multi-criteria decision making and augmented reality according to an exemplary embodiment of the present disclosure.

First, referring to FIG. 1, the accommodation recommendation system according to the exemplary embodiment includes a context, an intelligent model, and a service. A context component is defined as two categories for modeling a user and a user environment.

The categories include various types of information. In an accommodation recommender part such as a hotel, a user context stores a location and a preference of the user.

The user preference means, for example, a restaurant, a transportation means, and an attraction type selected by the user, and an environment context is obtained even from geographical spatial data stored in the system.

Spatial information includes spatial information and non-spatial information. The spatial information includes hotel selection items such as the location of the hotel, a tourist attraction, the restaurant, and the transportation means.

The non-spatial information indicates cost and a number for each hotel. In an augmented reality (AR) visualization part, a user context includes general information (an age, etc.) of the user, a user heath status (eyesight, etc.), and a user location.

The environment context also includes information related to a test environment and visitation object formation. In a text system condition, an environment is defined as a weekly parameter. Further, visited object information includes an image, a location, and general text information related to an object.

An intelligent model is a system analysis used for analyzing a context for providing a recommendation service. An accommodation recommendation model is based on spatial filtering (SF) and multi-criteria decision making (MCDM). Context information is used and the SF is executed to create a candidate hotel list around the user, and a candidate hotel created by using an MCDM method and TOPSIS (technique for order of preference by similarity to ideal solution) are compared.

The comparison may be based on various criteria such as a cost, the number of hotels, a transportation in the candidate hotel, and distances up to the attraction and the restaurant.

A transportation means, an attraction, and a restaurant of preferred types are pre-defined by the user and stored in the context as user preference information.

A result of the process is selection of a final hotel displayed in a map (e.g., a Google map, etc.) in order to provide an easy search to the user.

An extension model executes the SF, and then applies both clustering and MCDM.

In addition, second, information on a recommended accommodation is provided as augmented reality.

This model displays an attribute of information for visualization by using the context and the AR technology, and is constituted by three parts, i.e., text size setting, detailed level (Level-of-Detail or LOD) setting, and visualization. Various statistics including rule definition, distance calculation, fuzzy function use, etc., are applied.

A result of the statistics is to set a function of display information such as a level and use such a function in AR visualization.

A service component is an output of a system that transfers the result to the user. For example, services related to hotel recommendation and AR visualization model services showing the location of the hotel selected in the Google map are provided.

Referring to FIG. 2 schematically illustrating the configuration of the system of recommending an accommodation for tourists according to an embodiment of the present disclosure may include a communication unit 10, a storage unit 20, and a control unit 30, but the control unit may include an accommodation recommendation unit 31 and an augmented reality unit 32 according to the functions.

The communication unit 10 is for communication through a user terminal and an Internet network, a mobile communication network, etc., and will be apparent to those skilled in the art, so a more detailed description will be omitted.

The storage unit 20 stores the user information for the personal information (the age, the gender, etc.) and the preference information for presubscribed users. In addition, the storage unit 20 may further store information on each accommodation (hereinafter, referred to as tourist accommodation) including a location and an indoor image, and according to another embodiment, the tourist accommodation information may also be stored and managed in a separate DB.

The control unit 30 performs a function to select and provide the recommended accommodation to the user based on the user information and the tourist accommodation information stored in the storage unit 20.

The accommodation recommendation unit 31 of the control unit 30 selects a recommendation target accommodation based on a current location of the user by referring to the storage unit 20, and selects a plurality of recommended accommodations based on the user information including pre-registered preference information among the recommendation target accommodations. A recommendation scheme of the accommodation recommendation unit is performed by using the multi-criteria decision making (MCDM), etc.

The augmented reality unit 32 provides an augmented reality interface displaying information on the recommended accommodation to a terminal device (hereinafter referred to as user terminal) of the user. The augmented reality is used in various fields and is thus apparent to those skilled in the art, so a detailed description of the technology itself will be omitted.

In particular, the augmented reality unit 32 provides text information for a distance, a price, etc., and an indoor internal image (e.g., an image or a moving picture acquired by photographing a room, a kitchen, or a toilet) of the corresponding accommodation, in displaying the information on the recommended accommodation through the augmented reality.

Referring to FIG. 3 together with FIG. 2 schematically illustrating a processing process in the tourist accommodation recommendation system, a recommendation target accommodation is selected based on a current location of the user (S310).

For example, accommodations are selected which are positioned within a predetermined distance (e.g., 5 kilometers) based on a point where the user is currently positioned. Here, a range of the predetermined distance may vary depending on what a movement means preference of the user is by referring to the user information, and for example, in the case of a taxi, the range may be varied to 10 km and in the case of walking, the range may be varied to 1 km.

A plurality of recommended accommodations by the MCDM is selected based on the user information including the pre-registered preference information among the recommendation target accommodations (S320).

For example, the recommended accommodation is selected by referring to the general preference using the personal information such as the gender, the age, etc., of the user, a preferred price range which the user pre-registers as the preference information, a preferred accommodation type (the hotel, an inn, a motel, a resort, a pension, etc.), whether the accommodation is the latest, etc.

Here, the user context may include various information such as the general user information such as the location and the age of the user and user health information (including an eyesight problem).

The user will be able to directly input other user information such as the age and an eyesight problem state through a system interface.

In addition, an augmented reality interface displaying the information on the recommended accommodation is provided to the user terminal (S330). For example, each recommended accommodation is displayed on the map and each recommended accommodation information is displayed on the map or accommodation related information is displayed by a text and/or an image through the augmented reality in an external image photographed by the camera. Since an augmented reality implementation scheme may be diversified, a more detailed description will be omitted.

Figure 4:
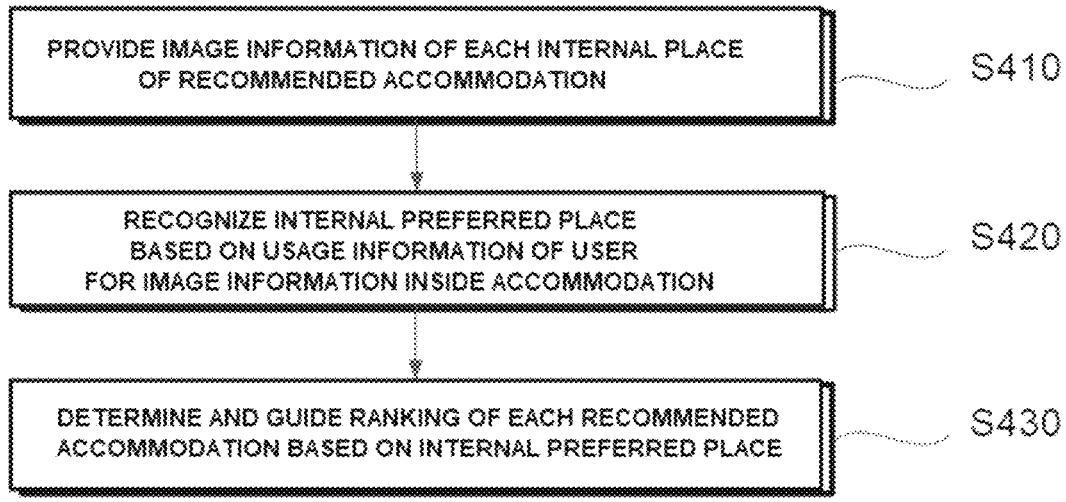
FIG. 4 is a flowchart illustrating a process of recognizing and utilizing a preferred place inside an accommodation of a user according to an exemplary embodiment of the present disclosure.

FIG. 4 is a flowchart illustrating a process of recognizing and utilizing an accommodation-in preferred place of a user according to an exemplary embodiment of the present disclosure, FIG. 5 is a table illustrating usage information of an augmented reality interface for recognizing an inside preferred place of a user according to an exemplary embodiment of the present disclosure, and FIG. 6 is a table illustrating user preference information for recommending an accommodation according to an exemplary embodiment of the present disclosure.

Referring to FIG. 4, image information of each place inside the recommended accommodation is provided (S410).

For example, images or moving pictures for the room, the toilet, the kitchen, a living room, and a terrace inside a hotel room of recommended hotel A are provided as the augmented reality interface.

An internal preferred place is recognized based on usage information of the user for accommodation-in image information (S420).

According to an example, the internal preferred place is recognized by using a search time for each place inside the accommodation which the user verifies by using the augmented reality interface. Further, the internal preferred place is identified by further using information by user voice recognition (using a voice input into the user terminal) in each internal place.

Referring to FIG. 5 illustrating an example therefor, for example, as an image search time (or a viewing time) is longer for each internal place, the internal place may be recognized as the internal preferred place, the contents (or a length of a word regardless of the contents, i.e., the total number of texts) may be used by recognizing the voice of the user.

Referring back to FIG. 4, a ranking for each recommended accommodation is determined based on the recognized internal preferred place and guided by using the augmented reality interface (S430).

Referring to FIG. 6, while the recommended accommodation is determined based on the current location, the personal information, and the preference information of the user and related information is provided by the augmented reality, the ranking for the recommended accommodation is determined by using the internal preferred place recognized based on a real-time reaction of the user and guided to the user to more accurately recommend an accommodation desired by the user. For example, when the internal preferred place of the user is the kitchen, the kitchen is prioritized to set the ranking of an accommodation in which the kitchen is well decorated to be higher.

Further, although not illustrated in the figure, according to an example, when indoor internal images for recommended accommodations are provided in the future, the internal preferred place is processed as a start location. For example, when an indoor internal image of hotel B is verified, the image according to the internal preferred place is first provided.

The method of recommending an accommodation for tourists using multi-criteria decision making and augmented reality according to the present disclosure may be implemented as a computer readable code in a non transitory computer readable recording medium. The computer readable recording medium includes all kinds of recording media storing data which may be deciphered by a computer system. For example, the recording media may include a read only memory (ROM), a random access memory (RAM), a magnetic tape, a magnetic disk, a flash memory, an optical data storage device, etc. Further, the computer readable recording media may be stored and executed as codes which may be distributed in the computer system connected through a computer communication network and read by a distribution method.

Further, the present disclosure has been described with reference to the preferred embodiments. However, it will be appreciated by those skilled in the art that various modifications and changes of the present disclosure can be made without departing from the spirit and the scope of the present disclosure which are defined in the appended claims.

What is claimed is:

1. A method of recommending an accommodation for tourists using multi-criteria decision making and augmented reality, which is performed by a server device, the method comprising:
   storing a pre-registered personal information and a location of a user in a storage unit;
   storing a pre-registered preference information of the user in the storage unit;
   selecting recommendation target accommodations based on the location of the user;
   selecting a plurality of recommended accommodations, from among the recommendation target accommodations, using a multi-criteria decision making (MCDM) model using the location of the user, the pre-registered personal information of the user, and the pre-registered preference information of the user;
   displaying the plurality of recommended accommodations to the user on a map on a user terminal;
   displaying information about the plurality of recommended accommodations on the user terminal using an augmented reality interface,
   selecting an internal preferred place according to a usage information of the user terminal, and
   determining a ranking for the plurality of recommended accommodations using information consisting of the location of the user, the pre-registered personal information of the user, and the pre-registered preference information of the user, and the internal preferred place, which is identified by a real-time reaction of the user,
   wherein the pre-registered personal information consists of the user's age, gender, health information and eyesight health, and
   wherein the pre-registered preference information of the user consists of a location of a hotel, a tourist attraction, a restaurant, transportation means, and a preferred price range,
   wherein the information displayed about the plurality of recommended accommodations on the user terminal using the augmented reality interface is image information for the internal preferred place of the plurality of recommended accommodations,
   wherein the internal preferred place is identified by using a viewing time, which the user verifies in real time by using the augmented reality interface, for each image information for the internal preferred place inside the recommended accommodations and a voice input from the user in real time in reaction to the image information for the internal preferred place.

2. The method of recommending an accommodation for tourists using multi-criteria decision making and augmented reality of claim 1, wherein the internal preferred place is identified by using a viewing time, which the user verifies in real time by using the augmented reality interface, for each image information for the internal preferred place inside the recommended accommodations.

3. The method of recommending an accommodation for tourists using multi-criteria decision making and augmented reality of claim 1, wherein the internal preferred place is identified by a voice input from the user in real time in reaction to the image information for the internal preferred place.

4. The method of recommending an accommodation for tourists using multi-criteria decision making and augmented reality of claim 2, wherein when internal images for the recommended accommodations are provided, the internal preferred place is processed as a start location.

5. A recording medium including an application having commands executable by a computer that is executed by a computer, wherein the application is configured to
   store a pre-registered personal information and a location of a user in a storage unit
   store a pre-registered preference information of the user in the storage unit
   select recommendation target accommodations based on the location of the user;
   select a plurality of recommended accommodations, from among the recommendation target accommodations, using a multi-criteria decision making (MCDM) model using the location of the user, the pre-registered personal information of the user, and the pre-registered preference information of the user;

display the plurality of recommended accommodations to the user on a map on a user terminal;

display information about the plurality of recommended accommodations on the user terminal using an augmented reality interface, select an internal preferred place according to a usage information of the user terminal, and determine a ranking for the plurality of recommended accommodations using the location of the user, the pre-registered personal information of the user, and the pre-registered preference information of the user, and the internal preferred place, which is recognized based on a real-time reaction of the user, wherein the pre-registered personal information consists of the user's age, gender, health status and eyesight health, and wherein the pre-registered preference information of the user consists of a location of a hotel, a tourist attraction, a restaurant, transportation means, and a preferred price range.

6. A system of recommending an accommodation for tourists using multi-criteria decision making and augmented reality, the system comprising:

a storage unit storing information on a tourist accommodation including a location, cost, and an indoor image of the tourist accommodation and information on a user consisting of a pre-registered personal information, a pre-registered preference information, and a user location;

an accommodation recommendation unit selecting recommendation target accommodations by referring to the information on the user in the storage unit, selecting a plurality of recommended accommodations by multi-criteria decision making using the pre-registered preference information from among the recommendation target accommodations, and determining a ranking for the recommendation target accommodations using an internal preferred place that is recognized based on a real-time reaction of the user and the information on the user in the storage unit; and an augmented reality unit providing an augmented reality interface displaying information on the recommended accommodations to a user terminal, wherein the real-time reaction of the user is obtained from the augmented reality unit wherein the pre-registered personal information consists of the user's age, gender, health status and eyesight health, and wherein the pre-registered preference information of the user consists of a location of a hotel, a tourist attraction, a restaurant, transportation means, and a preferred price range.

\* \* \* \* \*